United States Patent [19]

Stojanovski

[11] Patent Number: 5,108,234
[45] Date of Patent: Apr. 28, 1992

[54] BALL NOSE MILLING TOOL

[76] Inventor: Stojan Stojanovski, 1950 Birchwood, Troy, Mich. 48084

[21] Appl. No.: 735,049

[22] Filed: Jul. 24, 1991

[51] Int. Cl.$^5$ .......................... B23P 15/34; B23C 5/22
[52] U.S. Cl. ....................................... 407/40; 407/46; 407/48; 407/113
[58] Field of Search ............... 407/34, 40, 46, 48, 407/54, 42, 53, 90, 103, 113; 408/187, 188, 199, 233, 713

[56] References Cited

U.S. PATENT DOCUMENTS

| | | | |
|---|---|---|---|
| 4,251,172 | 2/1981 | Durand | 408/228 |
| 4,423,989 | 1/1984 | Kress et al. | 408/197 |
| 4,512,689 | 4/1985 | Bylund | 407/103 X |
| 4,566,828 | 1/1986 | Reinauer | 407/48 |
| 4,679,968 | 7/1987 | Tsujimura et al. | 408/713 X |
| 5,064,316 | 11/1991 | Stojanovski | 407/40 |

Primary Examiner—Steven C. Bishop
Attorney, Agent, or Firm—Charles W. Chandler

[57] ABSTRACT

A ball nosed milling tool that includes a cutter plate having circular segmental cutting edges formed by chord-oriented shoulders inset into opposite faces of the plate. The shoulders form cutting faces that are acutely angled to the midplane of the plate, such that chips are directed away from the rotational axis of the cutter plate. The cutter plate is clamped within a slot in a supporting spindle by means of a threaded fastener that extends transversely through the plate and the spindle. A cylindrical shank portion of the fastener is oriented to exert a cam action on the surface of a hole in the cutter plate, such that the plate is firmly seated in the spindle slot.

9 Claims, 1 Drawing Sheet

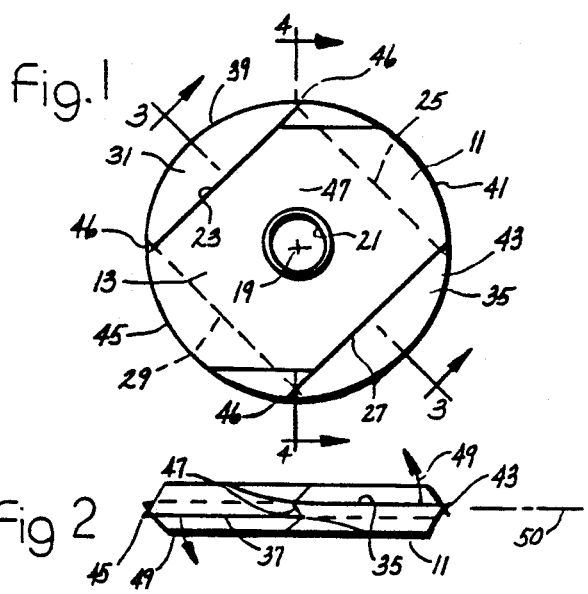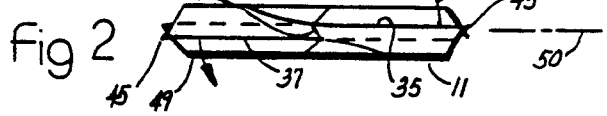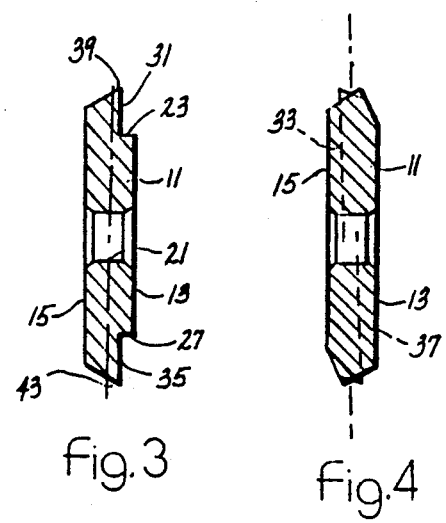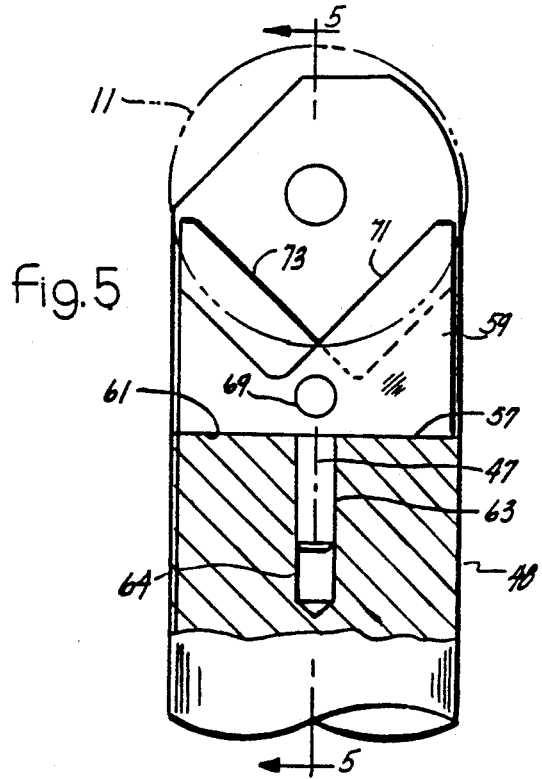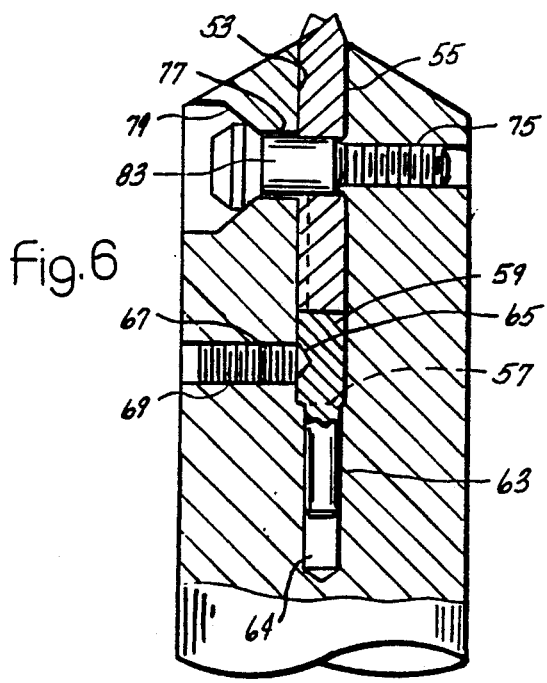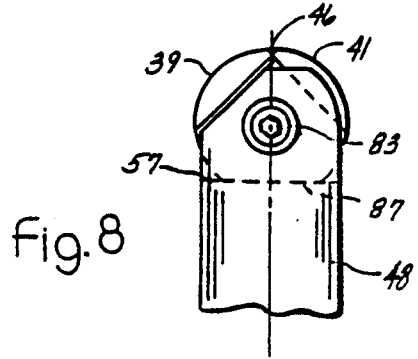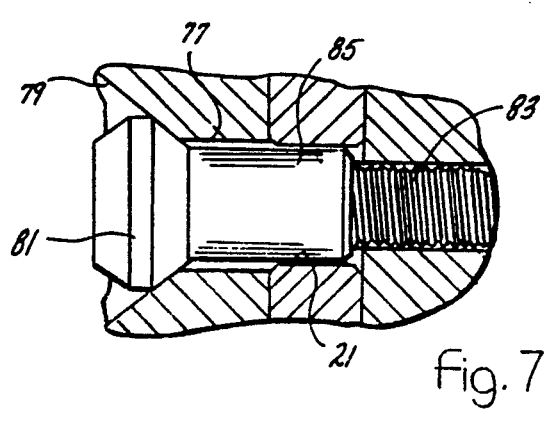

BALL NOSE MILLING TOOL

BACKGROUND OF THE INVENTION

Cross Reference to Related Patent Application

The milling tool shown herein is in some respects similar to a tool shown in my copending patent application, Ser. No. 650,777. The present invention is considered to be an improvement on the tool shown in application Ser. No. 650,777.

Field of the Invention

This invention relates to a ball nosed milling tool designed to form a semi-circular cross-sectioned groove in a metal work piece. The tool may be used to form a helical grooved track on a ball track on a ball screw. Other uses of the tool are possible.

Prior Art Developments

My prior U.S. patent application Ser. No. 650,777 discloses a ball-nosed milling tool that includes a spindle adapted for rotation around its longitudinal axis. A circular cutter plate is located within an axially-extending slot in the end of the spindle, so that during spindle rotation, circular cutting edges on the plate advance into the work to form a semi-circular cross-sectioned groove in the work surface.

Each circular cutting edge has a flat cutting face presented to the work for achievement of a cutting action. The cutting faces are acutely angled to the midplane of the cutter plate so that chips formed during the cutting operation are forced toward the spindle axis. The chips tend to remain in the machined groove where they can come into contact with the cutter surfaces, thereby possibly shortening the service life of the tool.

The present invention involves a reorientation of the flat cutting faces on the circular cutter plate, whereby chips formed during the cutting operation are forced away from the spindle axis. The chips tend to flow out of the machined groove and away from potential contact with the cutter surfaces. This feature can contribute to a lengthened service life for the tool.

In the milling tool shown in aforementioned patent application, Ser. No. 650,777, there are four arcuate cutting edges on the cutter plate. Each arcuate cutting edge has a circumferential length that is one-fourth of the cutter plate circumference. In the milling tool of the present invention, each of the four arcuate cutting edges has a circumferential length that is slightly greater than one-fourth of the cutter plate circumference, so that end edges of adjacent cutter edges overlap when viewed in a direction normal to the cutter plate plane. The overlap is believed to somewhat improve the cutting action while lessening the need for excessive precision in cutter plate construction.

Aforementioned U.S. patent application Ser. No. 650,777 includes a screw type fastener for clamping the cutter plate in the spindle slot. The fastener has a frusto-conical head that exerts a cam action on a hole surface in the cutter plate, whereby the cutter plate has a firm fixed anchorage in the spindle. The present invention includes a clamping fastener having a cylindrical shank portion engageable with a side surface of a hole extending through the cutter plate, whereby the fastener has an enhanced cam surface engagement with the cutter plate hole.

The use of a circular cutter plate anchored within a slot in the end of a rotatable spindle is shown in other patents, such as U.S. Pat. No. 4,251,172 to A. Durand, and U.S. Pat. No. 4,423,989 to Kress et al. The present invention is believed to represent a departure from the milling tools shown in those patents.

THE DRAWINGS

FIG. 1 is a plan view of a cutting plate embodying features of the present invention.

FIG. 2 is a bottom edge view of the FIG. 1 cutter plate.

FIG. 3 is a sectional view taken on line 3—3 of FIG. 1.

FIG. 4. is a sectional view taken on line 4—4 in FIG. 1.

FIG. 5 is a longitudinal sectional view taken through a spindle and holder for mounting the FIG. 1 cutter plate. The cutter plate outline is shown in phantom.

FIG. 6 is a sectional view taken on lines 6—6, in FIG. 5, with the cutter plate shown in section.

FIG. 7 is an enlarged fragmentary sectional view of a fastener mechanism used in the FIG. 6 assembly.

FIG. 8 is an elevational view of another milling tool embodying features of the invention.

DESCRIPTION OF THE PREFERRED EMBODIMENT OF THE INVENTION

FIGS. 1 through 4 show a circular cutter plate 11 having two parallel flat side faces 13 and 15. The plate has a circular peripheral edge 17 centered on a central axis 19; a circular hole 21 extends transversely through the plate.

Four straight chord-oriented shoulders 23, 25, 27 and 29 are machined into side faces 13 and 15 of the cutter plate. Shoulders 23 and 27 are inset into side face 13 of the cutter plate, whereas shoulders 25 and 29 are inset into side face 15 of the cutter plate. The various inset shoulders form flat cutting faces set back from the associated side face 13 or 15 of the cutter plate. The flat cutting faces are designated by numerals 31, 33, 35 and 37.

Each flat cutting face intersects the peripheral edge of the cutter plate to form an arcuate segmental cutting edge. Numerals 39, 41, 43 and 45 reference the four arcuate cutting edges. Each chord-oriented shoulder 23, 25, 27 or 29 has an orientation and length, such that each associated cutting edge has a circumferential length slightly greater than one-fourth of the cutter plate circumference. As a result, the ends of adjacent cutting edges overlap, when viewed normal to the cutter plate plane. Numeral 46 references the overlap.

When the cutter plate is mounted in a rotatable spindle, the cutter plate rotates around an axis 47 extending normal to axis 19 of transverse hole 21. In FIG. 2, numeral 49 indicates the directions of movement taken by the cutter faces. Each cutter face 31, 33, 35 or 37 is acutely angled to midplane 50 of the cutter plate; the angulation is such that metal chips formed by the exposed cutting edges flow away from rotational axis 47 toward the outboard edges of the cutter plate remote from axis 47. The chips are thus removed from the path of the rotating cutter plate and potential harmful contact with the cutting surfaces.

FIGS. 5 and 6 show a spindle and holder mechanism for operatively supporting the FIG. 1 cutter plate. The spindle 48 has a circular cross-section taken normal to the spindle axis 47 (which is coincident with the cutter plate rotational axis). As shown in FIG. 6, the spindle has an axial slot that forms two opposed flat side faces 53 and 55, and a transverse slot bottom face 57. A cutter plate holder 59 seats within the slot, with its flat end face 61 abutting slot bottom face 57. In order to center holder 59 within the slot, the holder is provided with a cylindrical post 63 that fits into a cylindrical socket 64 in the spindle. One side face of the holder has a conical recess 65 that registers with a set screw 67 that is threaded into a transverse threaded bore 69 in the spindle. The bore 69 axis is slightly offset from the center of conical recess 65 so that insertional motion of the set screw cams the cutter plate holder tightly against slot bottom face 57.

The upper edge area of holder 59 (as seen in FIG. 5) has a V-shaped configuration mated to the inset shoulders 23, 25 27 and 29 on cutter plate 11. Edge 71 of the V is located in the plane of the paper (FIG. 5) to abut shoulder 27, whereas edge 73 of the V is located behind the plane of the paper to abut shoulder 29. The two edges 71 and 73 occupy spaced parallel planes for proper alignment with the respective inset shoulders 27 and 29. With such an orientation of the cutter plate, the exposed cutter edges 39 and 41 act as cutters; cutter edges 43 and 45 are inactive.

Cutter plate 11 can be reoriented in the spindle slot so that edges 71 and 73 on the holder are in abutment with inset shoulders 23 and 25 on the cutter plate. In that orientation, cutter edges 43 and 45 act as cutters; cutter edges 39 and 41 are inactive.

FIGS. 6 and 7 illustrate a clamping means for rigidly positioning and retaining outer plate 1; in the spindle slot. The clamping means comprises the aforementioned hole 21 in the cutter plate, and two aligned bores 75 and 77 extending through the spindle normal to the cutter plate reception slot. Bore 75 is threaded, whereas the larger diameter bore 77 is smooth surfaced. A frusto-conical mouth surface 79 communicates with bore 77 for engagement with the frusto-conical head 81 of a threaded fastener 83.

Fastener 83 has a small diameter section in mesh with threaded bore 75 and a smooth-surfaced cylindrical section 85 extendable within hole 21. The axis of hole 21 is preferably slightly out of alignment with respect to bores 75 and 77 so that when the fastener is inserted (threaded) into the bores, cylindrical section 85 exerts a cam force on the hole 21 surface for biasing the cutter plate toward slot bottom face 57 (FIG. 5). Hole 21 can be slightly oversize relative to cylindrical section 85 of the fastener. Also, the axial length of the threaded section of the fastener is longer than the transverse thickness of cutter plate 11, so that during insertional movement of the fastener, the fastener threads are in mesh with threaded bore 75 before cylindrical section 85 of the fastener reaches hole 21. As section 85 moves into hole 21, it exerts a cam force on the hole surface. The hole and/or the leading edge of section 85 may be chamfered to facilitate entry of section 85 into the hole.

The misalignment of hole 21 versus bores 75 and 77 is relatively slight, only a few thousandths of an inch. There is some radial play between the threads on the fastener and the threaded surface of bore 75 (approximately .003 inch); the misalignment between hole 21 and bores 75 and 77 is made great enough to take up the thread play plus a further amount to ensure a tight fit of the cutter plate against surfaces 71 and 73 of holder 59.

Fastener 83 will be tightened sufficiently so that frusto-conical head 81 has pressure contact with conical surface 79. The slot side faces 53 and 55 are forced toward each other to exert a clamp action on the cutter plate, but only after cylindrical section 85 of the fastener has cammed the cutter plate into a tight fit with holder 59.

The cutter-spindle arrangement of FIGS. 5 and 6 provides for reversing the position of the cutter plate so that in one position of the cutter plate, cutter edges 39 and 41 are active cutters, and in an alternate position of the cutter plate, cutter edges 43 and 45 are active cutter surfaces. The various cutter faces 31, 33, 35 and 37 are slightly acutely angled to midplane 50 of the cutter plate for directing the chips laterally outwardly away from rotational axis 47; the acute angulation is only a few degrees, on the order of one or two degrees in a typical tool construction. The acute angulation has an additional advantage in that ends of the cutting edges remote from axis 47 slice into the work at a positive shear angle, thereby somewhat reducing the load on those ends (where the loads are the highest).

FIG. 8 shows a cutter-spindle arrangement, wherein the cutter plate has only two cutting edges 39 and 41. Each edge is formed by an inset shoulder similar to shoulders 23 and 25, such that cutting action is similar to that achieved with the FIG. 5 arrangement.

The FIG. 8 cutter plate can be held in the spindle slot without requirement for the special holder 59. A flat 87 is formed on the cutter plate for abutment against the slot bottom face 57. Fastener 83 ensures a tight fit between faces 87 and 57.

FIG. 8 represents a less preferred form of the invention. The preferred form of the invention is depicted in FIGS. 1 through 7.

What is claimed is:

1. A ball nosed milling tool comprising:
a rotary spindle having an axial slot extending within a plane coincident with the spindle diameter, said slot defining two opposed flat side faces and an interconnecting bottom face; a circular cutter plate having two parallel flat side faces and four arcuate peripheral cutting edges of the same circumferential length; each arcuate cutting edge being defined by a chord-oriented shoulder inset from a side face of the cutter plate; alternate ones of said chord-oriented shoulders being formed in alternate side faces of the cutter plate so that each side face has two diametrically spaced shoulders formed thereon; each inset shoulder forming a flat cutting face that intersects the associated circular edge of the plate to form one of said peripheral cutting edges; each chord-oriented shoulder being located so that each arcuate cutting edge has a circumferential length slightly more than one-fourth of the cutter plate circumference, whereby the ends of adjacent cutting edges overlap; each flat cutting face extending in a plane that is at a slight acute angle to the midplane of the cutter plate; the cutter plate being oriented in said slot so that two overlapped ends of two adjacent cutting edges are located on the spindle axis, whereby said two cutting edges move in opposite directions when the spindle is rotated to perform a metal cutting operation.

2. The milling tool of claim 1, wherein each cutting face is angled to the midplane of the plate so that metal chips formed by said two cutting edges flow away from the spindle axis.

3. The milling tool of claim 1, wherein each cutting face is angled to the midplane of the cutter plate so that the overlapped ends of said two cutting edges on the spindle axis are advanced relative to the other ends of said two cutting edges.

4. The milling tool of claim 1, wherein the angulation of each cutting face to the cutter plate midplane is at least one degree, each angulation being such that metal chips formed by said two cutting edges flow away from the spindle axis.

5. The milling tool of claim 1, and further comprising means for clamping s id cutter plate in said slot; said clamping means comprising a circular hole extending transversely through said cutter plate on its central axis, two aligned bores extending through the spindle normal to said slot, one of said bores being threaded and the other bore having a frusto-conical mouth, and a fastener extending through the aligned bores and circular hole; said fastener having a threaded section meshed with the threaded bore, a smooth-surfaced cylindrical section extending within the circular hole, and a frusto-conical head seatable in the frusto-conical mouth; the axis of the circular hole being slightly out of alignment with respect to the two bores so that the cylindrical section of the fastener exerts a cam action on the hole surface for biasing the cutter plate further into the slot toward the slot bottom face.

6. The milling tool of claim 5, wherein the threaded section of the fastener has a greater length than the cutter plate thickness, so that during insertional movement of the fastener, the fastener threads are in mesh with the bore threads before the cylindrical section of the fastener reaches the circular hole.

7. The milling tool of claim 5, wherein the threaded section of the fastener has a lesser diameter than the cylindrical section; said circular hole having a chamfered mouth to facilitate entry of the cylindrical section into the hole.

8. A ball nosed milling tool comprising: a rotary spindle having a axial slot extending within a plane coincident with the spindle diameter, said slot defining two opposed flat side faces and an interconnecting bottom face; a cutter plate having two parallel flat side faces and at least two arcuate peripheral cutting edges of the same circumferential length; each arcuate cutting edge being defined by a chord-oriented shoulder inset from a side face of the cutter plate; alternate one of said chord-oriented shoulders being formed in alternate side faces of the cutter plate so that each side face has at least one inset shoulder formed thereon; each inset shoulder forming a flat cutting face that intersects the associated circular edge of the plate to form one of said peripheral cutting edges; each chord-oriented shoulder being located so that each arcuate cutting edge has a circumferential length slightly greater than one-fourth of a complete circle measured along the circular plate periphery, whereby the ends of adjacent cutting edges overlap; each flat cutting face extending in a plane that is at a slight acute angle to the midplane of the cutter plate; the cutter plate being oriented in said slot so that two overlapped ends of two adjacent cutting edges are located on the spindle axis, whereby said two cutting edges move in opposite directions when the spindle is rotated to perform a metal cutting operation.

9. The milling tool of claim 8, wherein each cutting face is angled to the midplane of the cutter plate so that the overlapped ends of said two cutting edges on the spindle axis are advanced relative to the other ends of said two cutting edges, whereby metal chips formed by said two cutting edges flow in opposite directions away from the spindle axis.

* * * * *